W. LAMPLUGH.
CAR HOOD.
APPLICATION FILED APR. 12, 1912.

1,070,347.

Patented Aug. 12, 1913.

3 SHEETS—SHEET 1.

Attest:
Edgeworth Greene
Worthington Campbell

Inventor:
William Lamplugh
by
Redding + Greeley Att'ys

W. LAMPLUGH.
CAR HOOD.
APPLICATION FILED APR. 12, 1912.

1,070,347.

Patented Aug. 12, 1913.

3 SHEETS—SHEET 2.

Attest:
Edgeworth Greene
Worthington Campbell

Inventor:
William Lamplugh
by Redding & Greeley Att'ys.

W. LAMPLUGH.
CAR HOOD.
APPLICATION FILED APR. 12, 1912.
1,070,347.
Patented Aug. 12, 1913.
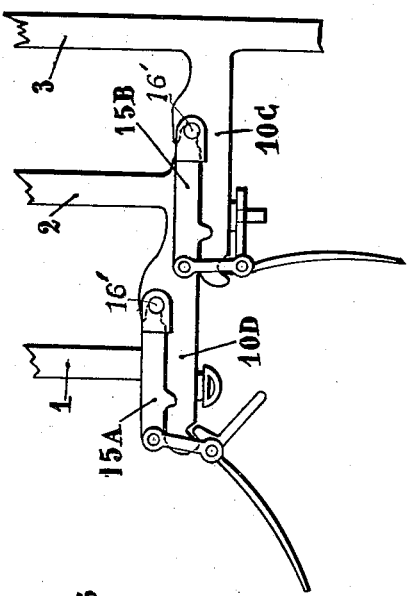
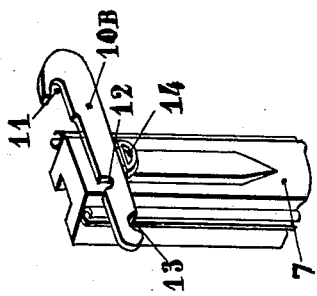
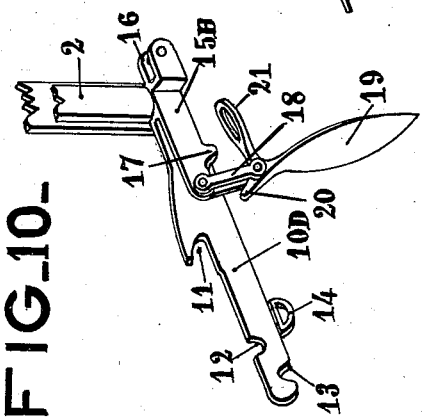
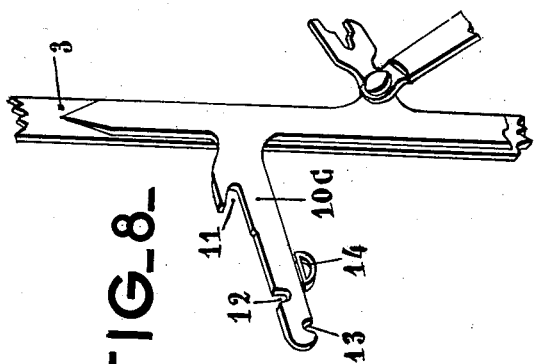
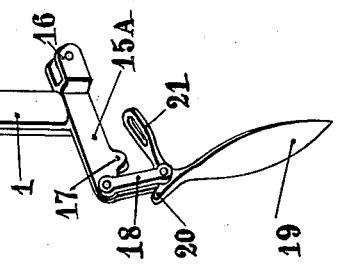
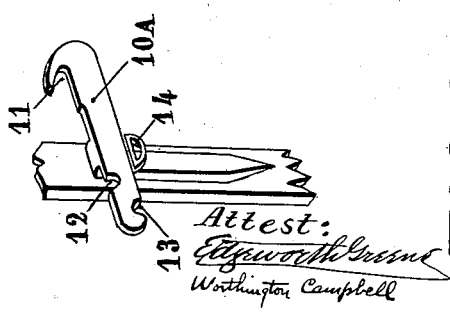

UNITED STATES PATENT OFFICE.

WILLIAM LAMPLUGH, OF LEVALLOIS-PERRET, FRANCE.

CAR-HOOD.

1,070,347.  Specification of Letters Patent.  Patented Aug. 12, 1913.

Application filed April 12, 1912.  Serial No. 690,439.

*To all whom it may concern:*

Be it known that I, WILLIAM LAMPLUGH, subject of the King of Great Britain and Ireland, residing at 8 Rue Ernest Cognacq, Levallois-Perret, Seine, France, have invented new and useful Improvements in Car - Hoods, of which the following is a specification.

This invention has for its object to provide an improved folding hood for motor cars of the "double phaeton," "torpedo" and other similar types, which is designed to cover the whole or part of the length of the car at will, and in which parts of some of the hoops are utilized as uprights for a wind screen and as uprights of an intermediate opening fitted with a glazed window sash.

This invention is carried out by means of simply and strongly constructed devices which secure a rigid and certain fixing of the hood in its various positions thus doing away with the noise attending fixing devices which are not certain in their operation.

The improved car hood is especially suitable for the use with the existing arrangement of flexible curtains slidable in grooves in the edges of parallel hoops, thus enabling the car to be closed completely.

Figure 1:
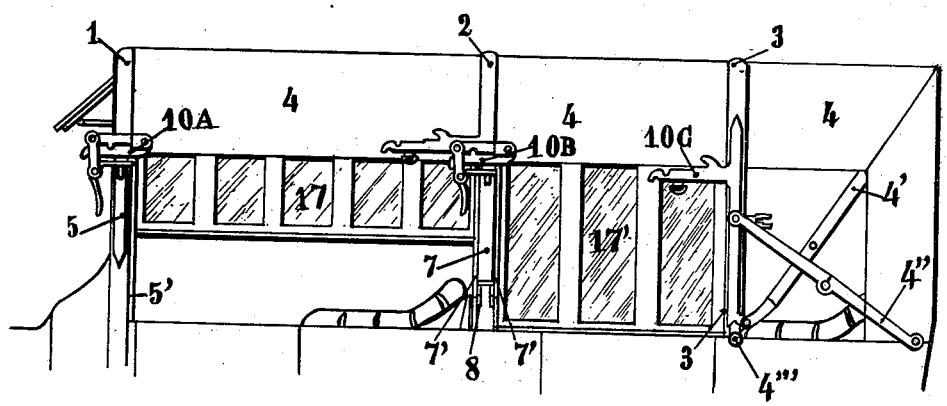
Figure 2:
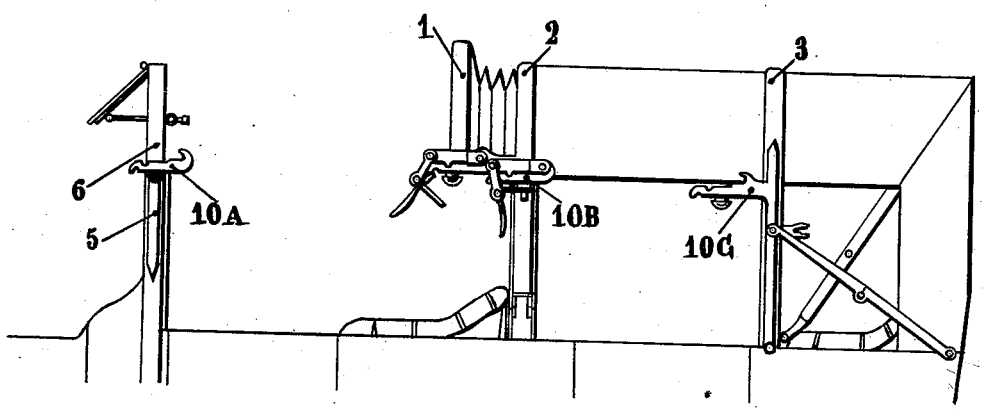
Figure 3:
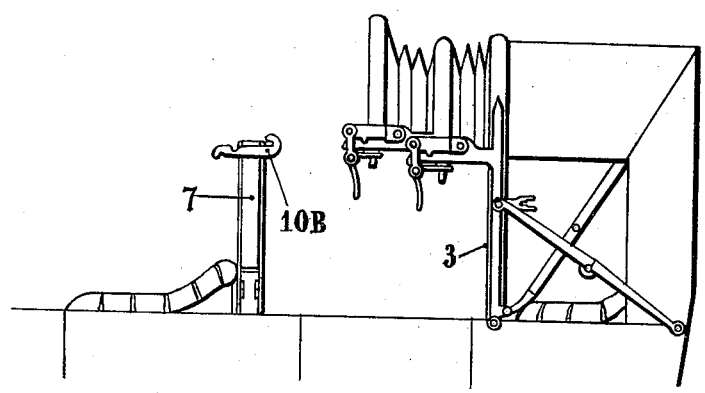
Figure 4:
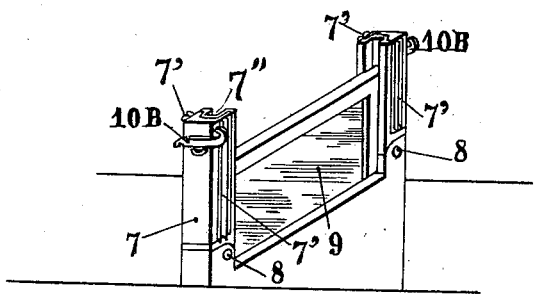
Figure 5:
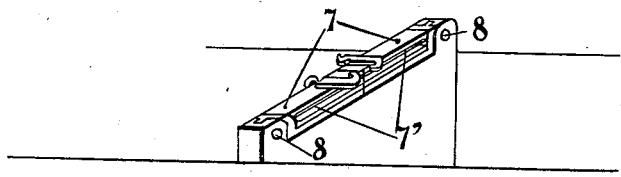

One embodiment of this invention is illustrated by way of example in the accompanying drawings in which:

Figure 1 is a side elevation of part of a motor car, showing the improved car hood drawn out to its full extent. This figure also shows sliding curtains combined with the hood and arranged to slide in grooves in the edges of the hoops. Fig. 2 is a side elevation showing the improved hood drawn out only as far as the back of the front seats. Fig. 3 is a side elevation showing the improved hood drawn out so as to cover only the back seats. Fig. 4 is a perspective elevation of the glazed window located behind the front seats with the folding uprights which constitute a part of the middle hoops of the hood for guiding the glazed sash. These uprights have grooved edges for the sliding curtains. Fig. 5 is a view similar to Fig. 4 showing the window and uprights in lowered position. Figs. 6 to 11 are views of the devices for fastening and connecting the upper parts of the hoops of the hood, to their sides forming the uprights for the wind screen and the uprights of the intermediate window, and for connecting the hoops to one another.

The improved car hood comprises three parallel hoops 1, 2, 3. The first hoop 1 is located in front at the wind screen; the second hoop 2 is located nearer the middle of the length of the car on a level with the backs of the front seats; the third hoop 3 is located at the back seats and is connected to the rear inclined hoops 4' and to the swivel 4''. Of these three hoops only hoop 3 is complete in one piece extending from the joint 4''' on one side and across the car to the symmetrically located joint 4''' on the opposite side. The two hoops 1 and 2 consist only of the upper curved portion as seen in cross sectional view, that is, the top of the hood at that place, and they are fixed to the hood. The vertical portions 5 which complete hoop 1 are fixed to the car body and constitute the permanent uprights for the wind screen. They are provided at their rear edges with grooves 5' in which the curtains 17 can slide upwardly and assume a position along the inner surface of the hood, whereby both the hood and the curtains are folded together. In this connection, it is to be noted that the curtains comprise a series of transparent and preferably oblong plates or the like connected by strips of relatively pliable material in which the creases are formed when the hood is folded.

The vertical portions 7 which complete hoop 2 are jointed at 8 (Figs. 4 and 5) to the car body on a level with the backs of the front seats. When they are vertical as shown in Figs. 1, 2, 3, and 4, they form uprights which are provided on their inner edges with grooves 7'' in which a glazed window sash 9 serving as a partition at the back of the front seats (as shown in Fig. 4) can be raised and lowered. These uprights have grooved slides 7', 7' on their edges for the curtains 17'. When the hood is not drawn out as far as this point, the uprights 7 may nevertheless be erected and the window may be raised as shown in Fig. 4, so as to form a wind screen at the back of the front seats; or if the window is lowered the uprights 7 are turned down on their pivots 8 across the car as shown in Fig. 5.

The devices for fastening hoop 1 to the uprights 5, hoop 2 to the uprights 7, or hoop 1 to hoop 2, and hoop 2 to hoop 3 are shown in detail in Figs. 6 to 11.

These devices comprise several elements which are repeated and added. A first element consists of a member which is indicated in the drawings by the references 10^A, 10^B, 10^C or 10^D, according to the different upright or hoop to which it is fixed. The member 10^A is fixed to the uprights 5 of hoop 1 and the wind screen (Fig. 6). The member 10^B is fixed to the uprights 7 of hoop 2 and the intermediate window (Fig. 7). The member 10^C is fixed to the rear hoop 3 (Fig. 8). The member 10^D is fixed to hoop 2, and is further combined with a member 15^B hereinafter described. The member 10 (A, B, C or D) consists of a cut-out part having a hook 11, a notch 12 in its upper edge, and a notch 13 in its lower edge and a turn-button 14 on the latter. Hoop 1 is provided with a member 15^A, and hoop 2 is provided with a member 15^B with which is combined the aforesaid member 10^F. This member 15 (A or B) consists of a small plate having at its rear end a fork 16 through which a pin 16' passes, and on its underside toward its front end a projection 17. The front end of the member 15 has jointed to it by means of a pair of links 18 a lever 19 shaped as a handle provided with a nose 20 and an eye 21. This member 15 (A or B) is designed to engage with the member 10 in such a manner as thereby to fasten firmly together the two parts to which they are attached, that is to say, hoop 1 or 2 with the upright 5 or 7, or hoop 1 on hoop 2, or hoop 2 on hoop 3. The member 15 (A or B) is engaged with the corresponding member 10 (A, B, C or D) as follows:—The pin 16' of the fork 16 engages hook 11, and the projection 17 engages notch 12. The members are fixed together by means of the lever 19 which is placed so that its nose 20 engages notch 13, and its eye 21 engages the turnbutton 14 which is then turned. Figs. 6 to 11 illustrate the detailed construction of these devices. In Fig. 11 hoop 1 is fixed by its member 15^A upon the member 10^D of hoop 2. The latter is fixed by its member 15^B upon the member 10^C of hoop 3. In Fig. 11 the lever of member 15^B is fixed to member 10^C, while the lever of member 15^A is not fixed. Figs. 1, 2 and 3 show the general arrangement of the hood provided with these devices, according as the hood is drawn out completely or partially. These devices have the advantage of enabling the hood to be fixed and unfixed rapidly in any position and of a strong and secure fastening together of the parts. Although the improved hood is more particularly applicable to motor cars, it may, however, be applied to other structures, for instance, to small boats.

What I claim is:—

In combination with a flexible folding hood provided with a relatively fixed supporting hoop adjacent one end and a plurality of relatively movable hoops secured in spaced relationship between the relatively fixed hoop and the free end of the hood, relatively fixed supports for the respective hoops when the hood is in distended position, brackets carried by each of said supports to receive corresponding brackets on the respective hoop, the upper face of the bracket of each support being formed with lugs and recesses and the lower face of the bracket of each hoop being formed with corresponding lugs and recesses to coöperate with the lugs and recesses of the bracket of its respective support, and a clamp carried by the bracket of each hoop and movable to engage the bracket of the respective support to secure the hoop to the support, the upper face of the bracket of each hoop being provided with lugs and recesses similar to the lugs and recesses of the bracket of its respective support to coöperate with the lugs and recesses on the lower face of the bracket of the adjacent hoop and the clamp of the displaced hoop being mounted to engage operatively the bracket of said adjacent hoop to secure the hoops together rigidly when the corresponding section of the hood is folded.

In testimony whereof I have signed my name to this specification in the presence of two subscribing witnesses.

WILLIAM LAMPLUGH.

Witnesses:
 LUCIEN MEMMINGER,
 GUSTAVE DUMONT.